(12) United States Patent
Aust et al.

(10) Patent No.: US 8,335,836 B2
(45) Date of Patent: *Dec. 18, 2012

(54) SYSTEM AND METHOD FOR GENERATING A CONSISTENT USER NAME-SPACE ON NETWORKED DEVICES

(75) Inventors: Brian S Aust, Redmond, WA (US); David G. De Vorchik, Seattle, WA (US); Yun Lin, Kirkland, WA (US); Timothy P McKee, Seattle, WA (US); Jason F. Moore, Seattle, WA (US); Shishir Pardikar, Redmond, WA (US); Mohammed Samji, Bellevue, WA (US); David C Steere, Belleview, WA (US); Navjot Virk, Belleview, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,681

(22) Filed: Jan. 30, 2012

(65) Prior Publication Data

US 2012/0131128 A1    May 24, 2012

Related U.S. Application Data

(63) Continuation of application No. 10/768,819, filed on Jan. 30, 2004, now Pat. No. 8,108,483.

(51) Int. Cl.
    *G06F 15/16* (2006.01)

(52) U.S. Cl. .............. 709/213; 709/217; 715/736
(58) Field of Classification Search .......... 709/213, 709/217
    See application file for complete search history.

(56) References Cited

U.S. PATENT DOCUMENTS

| 5,729,734 A * | 3/1998 | Parker et al. ............ 1/1 |
| 5,794,006 A * | 8/1998 | Sanderman ......... 709/223 |
| 5,893,116 A * | 4/1999 | Simmonds et al. ..... 709/229 |
| 2002/0128995 A1* | 9/2002 | Muntz et al. ............ 707/1 |

OTHER PUBLICATIONS

Overlook: Scalable Name Service on an Overlay Network Microsoft Research Marvin, Theimer and Micheal B. Jones Apr. 2002.*

* cited by examiner

*Primary Examiner* — Patrice Winder
*Assistant Examiner* — Tauqir Hussain
(74) *Attorney, Agent, or Firm* — Shook Hardy & Bacon LLP (57) ABSTRACT

Implementing a consistent user name-space on networked computing devices includes various components and methods. When a network connection between a local or host computing device and one or more remote computing devices is present, remote items are represented using the same methodology as items located on the host computing device. To the user, remote and local items are indistinguishable. When the network connection is lost or items located on a remote computer are otherwise unavailable, the unavailable items remain represented on the host computing device. Unavailable items are represented in a way that informs the user that the items may not be fully accessed.

12 Claims, 8 Drawing Sheets

SYSTEM AND METHOD FOR GENERATING A CONSISTENT USER NAME-SPACE ON NETWORKED DEVICES

CROSS-REFERENCE TO RELATED APPLICATIONS

This application is a continuation of U.S. application Ser. No. 10/768,819, which was filed Jan. 30, 2004. U.S. application Ser. No. 10/768,819 will issue as U.S. Pat. No. 8,108,483. U.S. application Ser. No. 10/768,819 is incorporated by reference herein.

FIELD OF THE INVENTION

In general, the present invention relates to the name-space of software driven (i.e., computational) devices and, more particularly, to the user name-space of networked computational devices.

BACKGROUND OF THE INVENTION

The continuing proliferation of powerful and convenient computational devices, such as personal computers, personal digital assistants, cellular telephones, etc., has been accompanied by a growth in the use of networks to connect these devices. Further, developments in network technology are increasing the ways computer users interact and communicate with one another. For example, electronic mail may currently be sent to some wireless telephones rather than, or in addition to, a personal computer. In addition to personal computers, cellular phones and personal digital assistants may be used to access the Internet. The interaction between networked computational devices often involves the transfer of directories and files ("items") between remote locations. Access to data located on remote computers permits users to easily modify items using any computer on a network. This increased connectivity permits greater sharing of information and freedom to choose locations to modify or update data.

Computer technology is now being used for a range of applications by users that are relatively technologically unsophisticated. Because the vast majority of the users of computational devices are not technologically sophisticated, software engineers and others who build software utilize various graphical interfaces designed to simplify the use of such devices. Graphical user interfaces employ pictorial depictions, such as icons, to convey information. Pictorial depictions may convey any number of different items to computer 5 users. Icons, for example, convey item metadata to users, such as the name and origin of the items. Preferably, pictorial depictions convey information which is self-evident or otherwise easily understood.

The growth in network connectivity has also been accompanied by advances in methods for managing and manipulating data located on remote computers. In some instances, users may not be aware that items being accessed by the user's local (host) device are actually located on a different (remote) device. For example, some distributed file systems group directories and files located on remote computers into the same file system for viewing and modification by local devices networked to the remote computers. From the user's perspective, both local and remote data appears to be similarly located because of the organizational structure of the file system. However, the actual location of data may be distributed among one or more remote machines.

A loss of a local or host device network connection renders directories and files located on remote devices unavailable. When directories are not available, their entries in the file system of the local devices are removed. As a result, the name-space of a file system is different, depending on whether a local device is or is not networked to remote devices. When connected, users are able to view items located on both the local device and on remote devices. However, when disconnected, users are only able to view items located on the local device. Since a user may not be aware that the no longer viewable directories and files are remotely located, the user may believe that data has been destroyed. Even though data has not been destroyed and will again become available when an appropriate network connection is again established, any perception by a user that data has been destroyed is undesirable.

Typically, when a network connection is lost, all information associated with remote items becomes inaccessible to users, including any associated metadata such as directory and file name, size, and application of origin. In some instances, it is desirable to allow a user of a local device to access remote directory and file metadata even when the local device is no longer networked to a remote device that contains the files and/or directories.

In order to avoid a user perception that temporarily unavailable remote items are destroyed when a device becomes disconnected from a network, there is a need for a system and method that implements a consistent user name-space regardless of whether a device is or is not connected to a network. Preferably, the existence of unavailable items will be conveyed to the user through a visual cue that is easily understood. Also, there is a need to permit users to access remote item metadata when items are otherwise unavailable because, for example, a local device is no longer connected to a network.

SUMMARY OF THE INVENTION

In accordance with this invention, a system and method for implementing a consistent user name-space on networked computing devices is provided. When a network connection between a local or host computing device and one or more remote computing devices is present, remote items are represented using the same methodology as items located on the host computing device. To the user, remote and local items are indistinguishable. When the network connection is lost or items located on a remote computer are otherwise unavailable, the unavailable items remain represented on the host computing device. In one embodiment of the present invention, unavailable items are represented in the graphical user interface of the host computer in a different manner, such as a diffuse icon that conveys to the user in an intuitive way that the items are unavailable. Preferably, in the event there is an attempt to access an unavailable item, the user is informed that remote items are inaccessible until an appropriate network connection is established.

In accordance with another aspect of the present invention, metadata stored on the host computer related to unavailable items is represented differently in the graphical user interface than items available to a user of the host computer.

In accordance with other aspects of the present invention, a system and method for implementing a consistent user name-space in a shared file location environment is provided. A shared file location is a designated area of data storage that is available to any computing device networked to the shared file location. While the shared file location may be distributed among several computing devices, host computing devices are able to access items shared on any of several computing devices since they are all networked together to via a network.

When a network connection to one or more of the shared file location computing devices is lost, items located on the inaccessible computing devices are still represented in a host computing (local) file system. However, unavailable items are represented in a way that informs users of the host computing device that the items may not be accessed until an appropriate network connection is established.

In accordance with yet other aspects of the present invention, a system and method for implementing a consistent user name-space in a caching environment is provided. Caching refers to copying items, such as directories and files, located on remote computing devices into a cache or storage area on a local computing device. When a network connection permits, i.e., the local computing device is networked to the remote computing devices, changes made to cached items are copied to the related remote computing device. When the local computing device is not networked to the remote computing devices, cached items can be changed, but only on the local computing devices. Changes are not copied to the remote computing devices until a network connection is established. Remote computing device items that have not been cached, and are therefore unavailable when the local computing device is disconnected from the network, are represented in a way that informs the user the items may not be accessed until an appropriate network connection is established.

As will be readily appreciated from the foregoing summary, the present invention provides a system and method of representing remote and local items that is more compatible with users' perceptions. Graphical user interface representations of remote items do not disappear when a network connection is lost. Instead, unavailable items are represented in a way that informs users that items exist but are not available until an appropriate network connection is established.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is generally directed to a system and method for providing a consistent user name-space between networked computers. More specifically, the present invention provides a system and method for querying computing devices and generating a graphical interface having pictorial depictions that differentiates between items based on their availability. When items are unavailable, they are represented in a way that informs the user that the items may not be accessed. Preferably, even though items are unavailable, all of the metadata associated with the unavailable items is still accessible and capable of modification.

Although the present invention will be described in the context of shared file locations and client side caching, those skilled in the relevant art and others will appreciate that the present invention may be implemented in alternative embodiments. Further, those skilled in the relevant art will appreciate that some or all of the aspects of the present invention may be practiced in stand-alone computers unassociated with a network. Accordingly, the described embodiments of the present invention should be construed as illustrative in nature and not as limiting.

Figure 1:
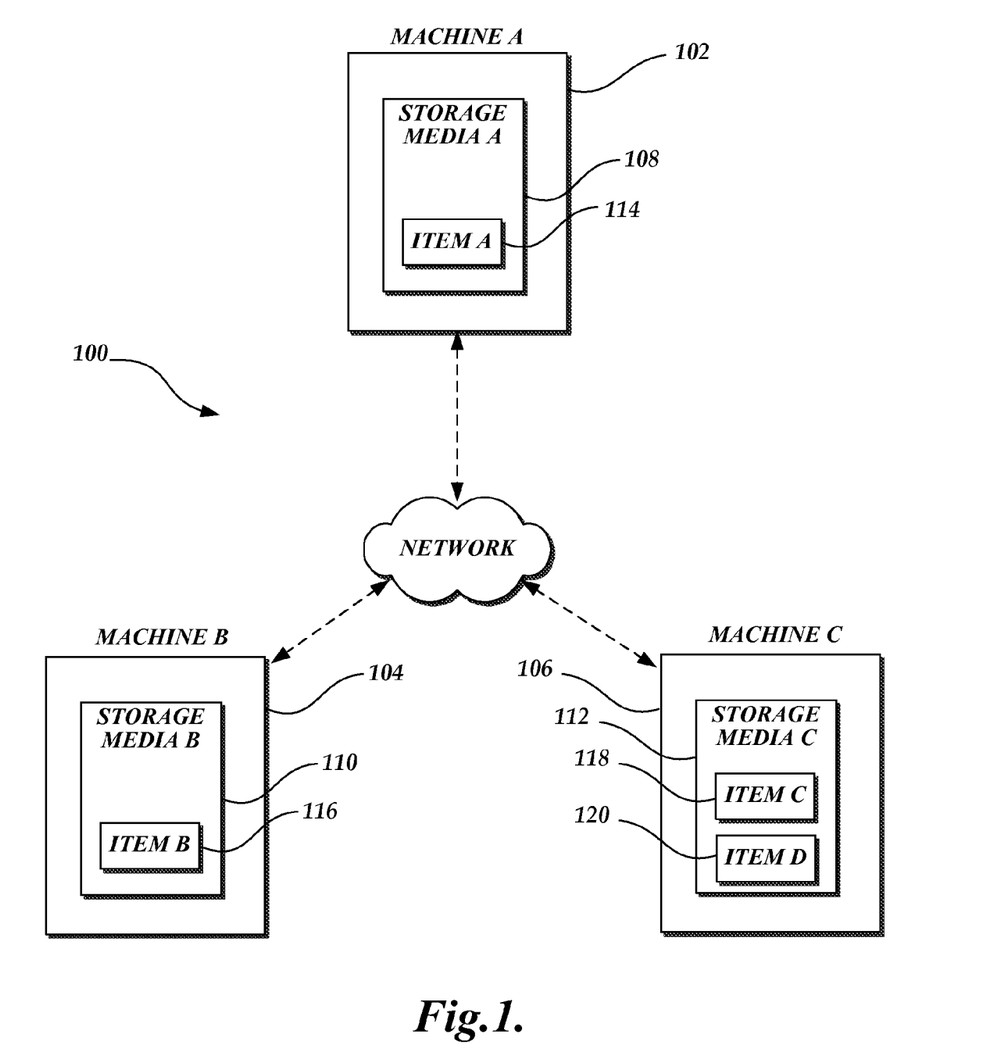
FIG. 1 is a block diagram of a computer network including three computing devices locally storing varied content capable of being networked together.

FIG. 1 is a block diagram of a network 100 that connects together three computing devices, designated "MACHINE A" 102, "MACHINE B" 104, and "MACHINE C" 106. The network 100 may be anyone of a variety of networks including, among others, a local area network (LAN), a wide area network (WAN), or a global network (such as the Internet). The network may be wired or wireless (for example, using Bluetooth or any of the IEEE 802.11 standards), or a combination. Connection to the network can be established using a variety of communication protocols (e.g., TCP/IP, IPX, SPX, NetBIOS, Ethernet, RS232, and direct asynchronous connections). A person skilled in the art will recognize that computing devices 102, 104, and 106 may also be directly connected, i.e., connected together, without crossing a network. Further, as will be readily understood by those skilled in the relevant art and others, FIG. 1 is illustrative and should not be construed as limiting. More or fewer computing devices may be connected to the network 100 either through remote or direct connections.

Also, the computing devices 102, 104, and 106 may be embodied as anyone of a variety of devices that may be utilized to persist content to the network 100. Examples of computing devices include, but are not limited to, personal computing devices, hand-held computing devices, server-based computing devices, personal digital assistants, mobile telephones, stand-alone memory devices, electronic devices having some type of memory, and the like. Other than storage media, FIG. 1 does not show the components of the computing devices 102, 104, and 106, such as a keyboard, a mouse, a printer, or other input/output devices, a central processing unit, a display, etc.

Each of the computing devices 102, 104, and 106 includes a storage media 108, 110, and 112, respectively, for storing items, such as directories, files, etc. "ITEM A" 114 symbolizes an item stored on the storage media, "STORAGE MEDIA A" 108, of the first computing device 102, i.e., MACHINE A. "ITEM B" 116 symbolizes an item stored on the storage media, "STORAGE MEDIA B" 110, of the second computing device 104, i.e., MACHINE B. "ITEM C" 118 and "ITEM D" 120 symbolize items stored on the storage media, "STORAGE MEDIA C" 110, of the third computing device 106, i.e., MACHINE C.

Computing devices typically includes a variety of storage media. By way of example, and not limitation, storage media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other non-transitory medium that can be used to encode desired information and be accessed by a computing device.

Memory typically includes computer-storage media in the form of volatile and/or nonvolatile memory. The memory may be removable, nonremovable, or a combination thereof. Exemplary hardware devices include solid-state memory, hard drives, optical-disc drives, etc. Computing devices often include one or more processors that read data from various entities such as memory.

The dashed lines between the computing devices and the network indicate that the computing devices are capable of transmitting data between the devices via the network 100. While the computing devices 102, 104, and 106 can share data, items stored in their respective storage media are only accessible from their related computing device. The items in the storage media are not shared in the sense that a computing device, such as MACHINE A, has no direct access to items, such as ITEM B of STORAGE MEDIUM B, even when all of the computing devices are connected to the network 100.

Figure 2:
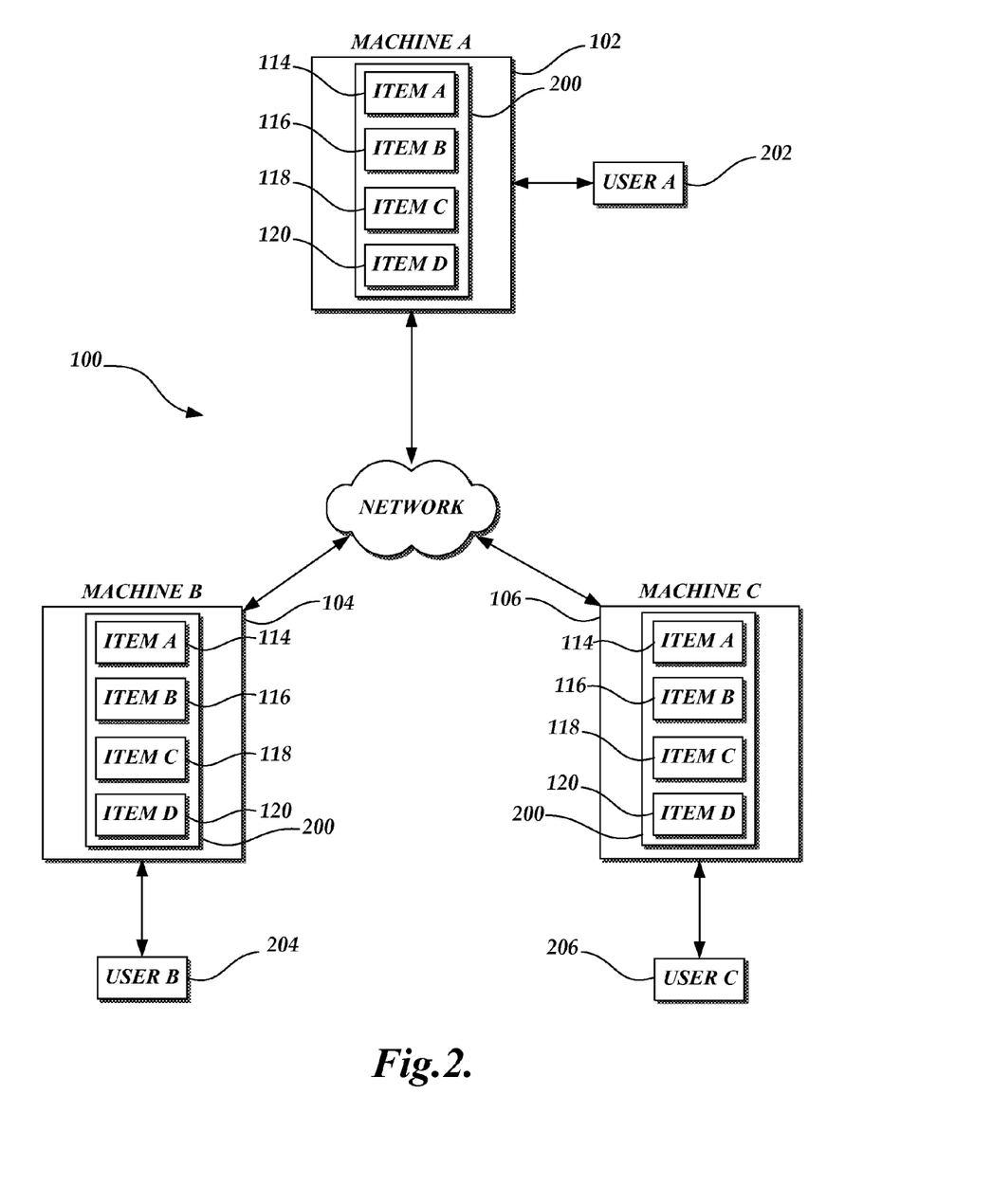
FIG. 2 is a block diagram of the computer network of FIG. 1 illustrating the content available to the three computing devices when they are networked together.
Figure 3:
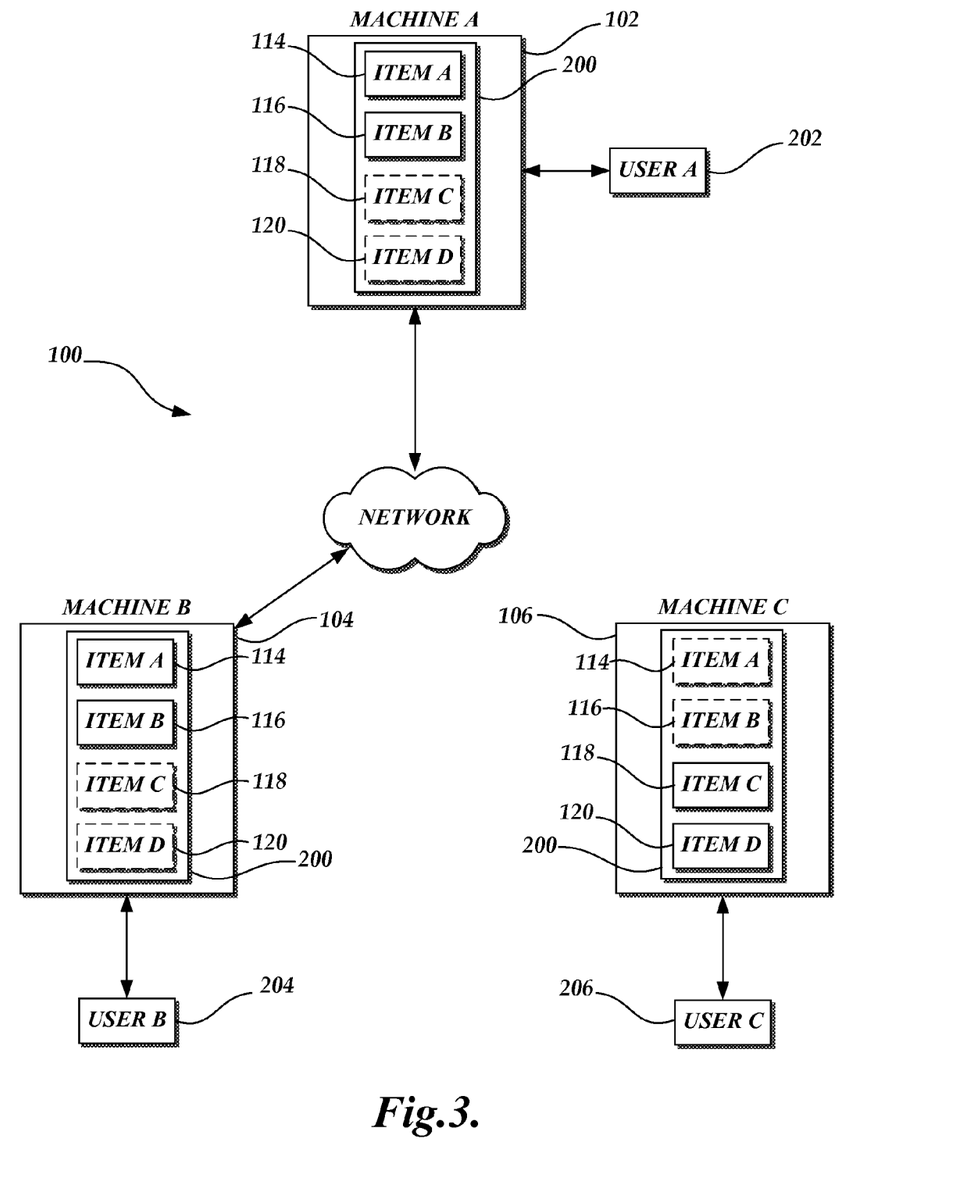
FIG. 3 is a block diagram of the computer network of FIG. 1 illustrating the content available to the three computing devices when one computing device is unavailable, i.e., no longer networked to the other two computing devices.

With reference to FIGS. 2-3, the present invention will be described in the context of shared file locations. In FIG. 2, a shared directory 200 identifies the items namely ITEM A, ITEM B, ITEM C, and ITEM D stored on the three computing devices 102, 104, and 106 shown in FIG. 1, now connected by the network 100. The shared directory is available to users of any of the computing devices. Thus, users, like "USER A" 202, "USER B" 204, and "USER C" 206, can access both local and remote items without having knowledge of the actual location of the items or the technical information necessary to retrieve the items. For example, USER A 202 is able to retrieve all of the items listed in the shared directory while using computing device 102, even though only ITEM A 114 is the only item physically located on the first computing device 102. Similarly, USER C 206 is able to access all of the items 114, 116, 118, and 120 while using the third computing device 106 even though only ITEM C 118 and ITEM D 120 are actually located on the third computing device 106. From the users' perspectives, all items listed in the shared directory 200 are available for access regardless of the actual location of the items. A more detailed explanation of an implementation of shared file locations can be found in commonly assigned, co-pending U.S. patent application Ser. No. 10/691,872, titled SYSTEM AND METHOD FOR GENERATING AGGREGATED DATA FILE VIEWS IN A COMPUTER NETWORK, filed Oct. 23, 2003, the context of which is expressly incorporated herein by reference.

FIG. 3 illustrates what occurs when one of the computing devices of the shared file location illustrated in FIG. 1 is disconnected from the network 100. More specifically, the lack of a connection between the network 100 and the third computing device 106 indicates that the third computing device 106 is not available to the other computing devices connected to the network 100. A computing device may be disconnected or otherwise become unavailable to other networked computing devices for anyone of a number of reasons well known to those skilled in the art. For example, a wired or wireless connection may be broken or the computing device may "crash" or a computing device may simply be turned off. When this occurs, in accordance with this invention, the shared directory 200 is still present on all of the computing devices 102, 104, and 106 and continues to list all of the previously listed items 114, 116, 118, and 120. However, access to the contents of shared directory items changes both for the computing devices 102 and 104 remaining connected to the network 100 and for the disconnected or unavailable computing device 106. In both instances, part or all of the content of some items are unavailable. In FIG. 3, partially or fully unavailable items are represented with dashed lines. In accordance with the present invention, USER A 202 and USER B 204 have complete access to the items 114 and 116 stored on their respective computing devices, namely ITEM A and ITEM B. However, since the third computing device 106 is not available or not connected to the network 100, the items 118 and 120, namely ITEM C and ITEM D, stored on the third computing device 106 are not accessible. However, USER C 206 has access to these items 118 and 120 since they are located on the third computing device 106. On the other hand, the items 114 and 116 stored on the first and second computing devices, namely, ITEMS A and B are not accessible.

Even though some items are not accessible to USERS A, B, and C until an appropriate network connection to the third computing device 106 is re-established, in accordance with this invention, metadata associated with items, and options for modifying this metadata, are still available to the users. For example, the name of a file is a common component of file metadata. Thus, a user may change the local name of a file even when the item file stream data is unavailable. When an appropriate network connection is re-established, such modified metadata is synchronized with the metadata located on the remote computing device that stores the item. Since metadata can be synchronized between computing devices in anyone of different methods known in the relevant art, such synchronization is not described here. Also, file metadata is available for services provided by the host computing device. For example, operating systems typically support searching of metadata for items that match criteria, i.e., users can search for files by name, size, and the like. Services provided by the host computing device that operate on metadata of unavailable items are still available to users.

Figure 4:
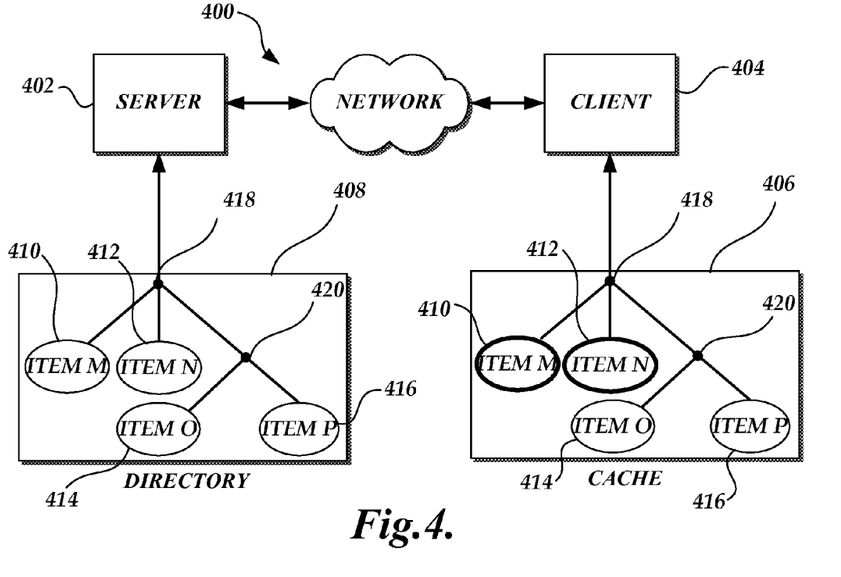
FIG. 4 is a block diagram of a computer network including client-server computing devices that include a client cache server directory that forms the basis for items stored in the client cache.
Figure 5:
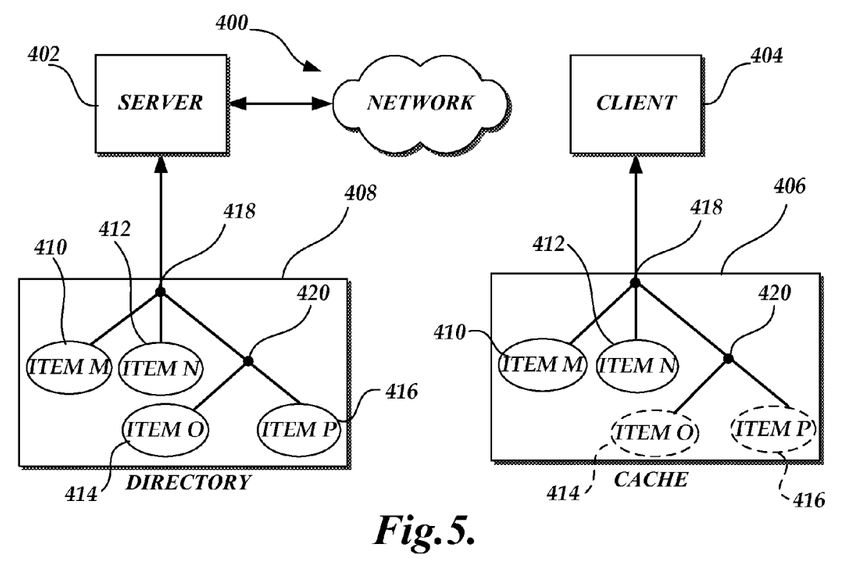
FIG. 5 is a block diagram of the computer network of FIG. 4 illustrating content available to the client computing device when the client computing device is no longer networked to the server computing device.

With reference now to FIGS. 4-5, the present invention will be described in the context of a client side cache. As used herein, a client side cache refers to a directory stored in a local computing device (cache) that is mapped to a directory stored on a remote computing device. A user may selectively choose to replicate some items in the client side cache so that these items can be modified when the local computing device is disconnected from the network to which the computing device is connected. Upon establishment of an appropriate network connection, modified local cache items are synchronized with the remote items. Alternatively, the client side cache may only store metadata related to the remote device items, i.e., the items stored on the remote computing device. In this instance, only the metadata stored in the local computing device can be modified when the local computing device is disconnected from the network. Typically, as shown in FIGS. 4 and 5, the remote computing device is a server and the local computing device is a client. While those skilled in the art will readily appreciate that the client side cache implementation shown in these figures is limited to a server/client system, it is to be understood that the client side cache implementation illustrated in FIGS. 4 and 5 and described below can be employed by a variety of systems other than client/server systems. A more detailed explanation of a client side cache can be found in commonly assigned, co-pending U.S. patent application Ser. No. 10/692,212, titled PERSISTENT CACHING DIRECTORY LEVEL SUPPORT, filed Oct. 23, 2003, the subject matter of which is incorporated by reference herein.

FIG. 4 is a block diagram that includes a network 400, and a server communication device 402 and client computing device 404 in communication with one another via the network. As described above with reference to FIGS. 1-3, the network 400 may be anyone of a variety of networks. Also, the server and client computing devices 402 and 404 may take the form of anyone of a variety of devices that are able to persist content to a communication network. A client side cache 406, located on the client computing device 404, stores items that are mapped from items stored on remote computational device 402 located in directory 408. As illustrated in FIG. 4, directory 408 stored on server computing device 402 contains four items symbolized by ITEM M 410, ITEM N 412, ITEM O 414, and ITEM P 416. All four items have been mapped to the client side cache 406. The four items are arrayed in a tree having hierarchical nodes. The illustrated tree has an upper level node 418 and a lower level node 420. ITEM M 410 and ITEM N 412 are associated with the upper level node 418, and ITEM O 414 and ITEM P 416 are associated with the lower level node 420. This difference is designed to point out a policy feature of the invention that may be desirable to employ in some actual embodiments of the invention, but is not required. More specifically, it may be desirable in some client side cache embodiments of the invention to establish a policy that some remote computing device items will be mapped to the client side cache and others will not be mapped, or only partially mapped. For example, only the metadata of some items may be mapped to the client side cache. In the embodiment of the invention shown in FIG. 4, the thicker lines surrounding ITEM M 410 and ITEM N 412 and the thinner lines surrounding ITEM O 414 and ITEM P 416 illustrate that higher node items are mapped to the client side cache and that lower node items are either not mapped, or are only partially mapped. Thus, FIG. 4 illustrates a policy wherein all items of the same elevation in the remote computing device directory tree are mapped to the client side cache. Those skilled in the art will recognize that this policy should be taken as illustrative and not limiting since many different policies may be used to control the mapping of remote computing device directories to local computing device caches.

FIG. 5 illustrates what occurs when the client computing device 404 is disconnected from the network 400. The absence of a dashed line between the network 400 and the client computing device 404 indicates that the client computing device 404 is disconnected from the network. Even though a network connection does not exist, the client computing device 404 can still navigate items mapped to the client side cache from the server computational device. However, access to the contents of the client side cache items is different when a network connection does not exist. As discussed above with reference to FIG. 4, some server computing device items are fully mapped, i.e., replicated in the client side cache 406. Even when the client computing device 404 is no longer connected to the network 400, these items are fully accessible from the client side cache 406. Users are able to modify all aspects of such items. In contrast, items that were not mapped or only partially mapped in the client side cache 406 can only be modified to the extent of their mapping when the client computing device is no longer connected to the network. In FIG. 5, these items, i.e., ITEM O 414 and ITEM P 416, are represented by dashed lines.

Figure 6:
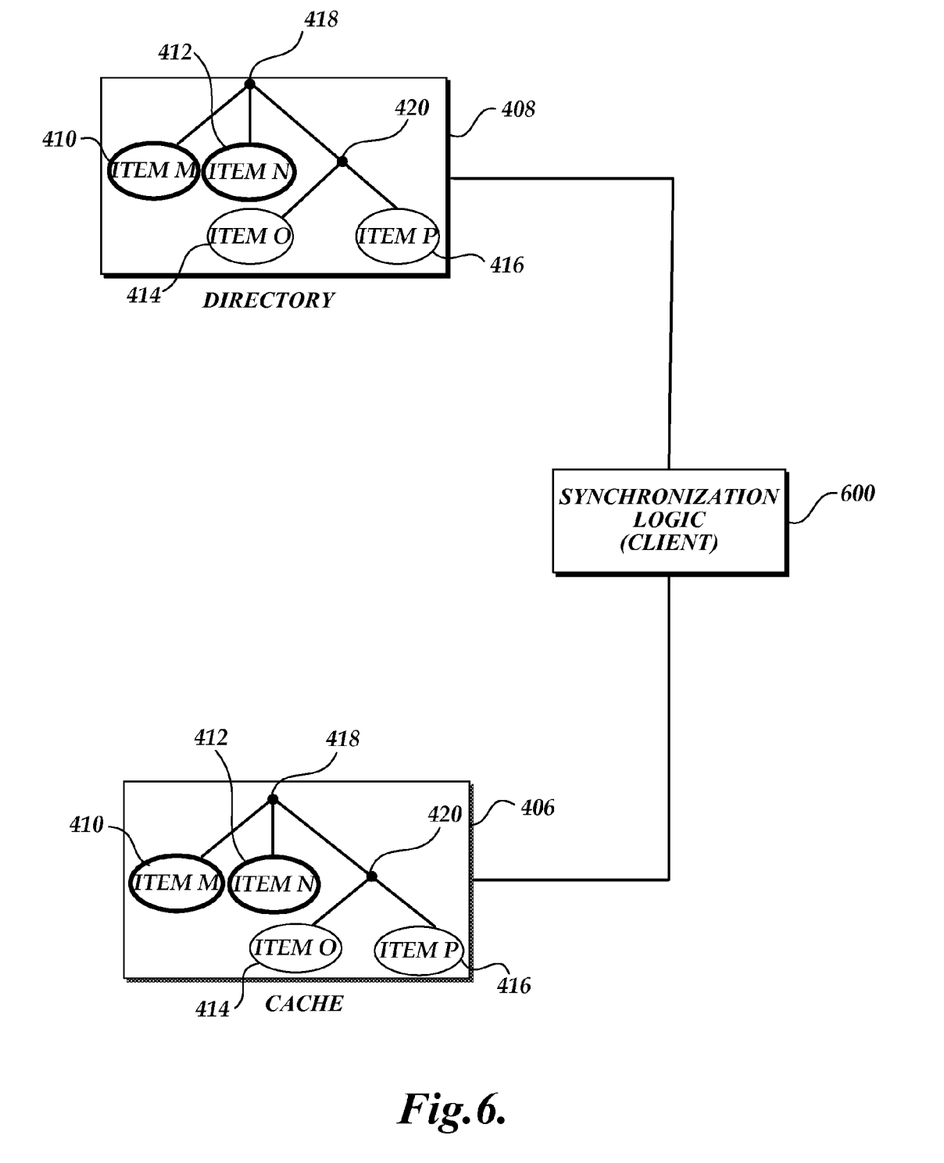
FIG. 6 is a block diagram of a computer network illustrating synchronization between two computing devices such as the client-server computing devices of FIG. 4.

With reference to FIG. 6, when a network connection between the client computing device 404 and the network 400 is re-established, the contents of the server computing device directory 408 and the client side cache 406 are synchronized. Changes made to the server computing device items fully mapped in the client side cache by the previously disconnected client computing device need to be reflected in the server computing device directory 408. Likewise, any changes made to the server computing device item mapped to the client side cache by other client computing devices need to be reflected on the client side cache. Both fully and partially mapped items must be synchronized, the partially mapped items only to the extent of their mapping. The synchronization logic 600 used to synchronize the server computing device items and client side cache item may be implemented in anyone of different ways known in the relevant art; none are described here. While, typically, the synchronization logic will be stored on the client computing device, those skilled in the art will recognize that the synchronization logic may be stored on the server computing device.

As noted above with respect to the three networked computing device system shown in FIGS. 2-3 and the client/server computing device system shown in FIGS. 4-5 when a network connection is re-established, the content of the re-connecting computing device must be synchronized with other network devices. FIG. 6 illustrates in block form such synchronization for the client/server computing device system shown in FIGS. 4-5, it being understood that similar re-connection synchronization occurs with systems of the type illustrated in FIGS. 2-3 and other systems embodying this invention. Also, a policy may be implemented where synchronization does not occur automatically. For example, when a user updates an item's metadata, such as file name, a policy may be implemented by the file's creator that prevents such an update. In this example, the update may require approval from the file's creator or may not be allowed under any circumstances. Those skilled in the art will recognize this as a simple example and that many different policies may be implemented to protect users in the synchronization process.

As will readily be appreciated from the foregoing descriptions of the shared file location system illustrated in FIGS. 2 and 3 and the client side cache system illustrated in FIGS. 4 and 5, the present invention is directed to providing a consistent user namespace on network connectable computing devices regardless of whether a computing device is or is not connected to a network when the device is being operated by a user. This is accomplished by denoting the status of all available items in the user name-space regardless of their location when a computing device is networked to other computing devices. When a computing device is not networked, the items available when the computing device was networked are still denoted in the user name-space except in a different manner. Locally available items, i.e., items stored on the non-networked computing device, are displayed in the same way as when the computing device is connected to the network, as a solid icon, for example. Non-locally stored items are denoted in a different way, such as a diffuse icon, for example. As described below in connection with FIG. 8, requests for items that are not locally stored on a non-networked computing device may result in the generation of status or information messages.

Figure 7:
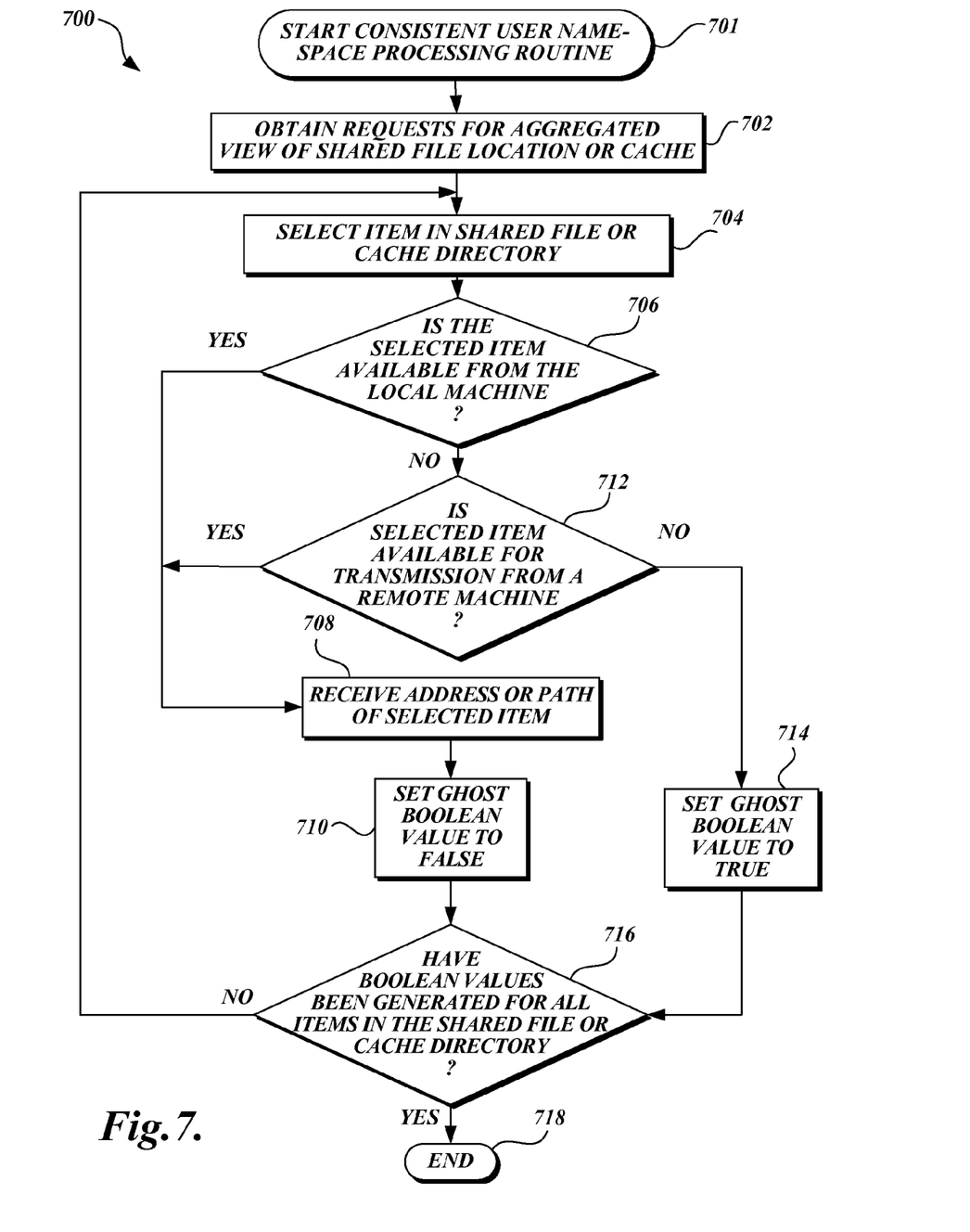
FIG. 7 is a flow diagram illustrative of a consistent user name-space processing routine in accordance with the present invention.

FIG. 7 is a flow diagram illustrative of a consistent user name-space processing routine 700 suitable for implementation by any of the computing devices 102, 104, or 106, shown in FIGS. 2-3 or the client computing device 404 shown in FIGS. 4-5. At 701, the consistent user name-space processing routine begins. At block 702, a request for an aggregated view of the shared file directory stored on the computing device (FIGS. 2-3) or a request for an aggregated view of the client side cache directory (FIGS. 4-5) occurs. The request may be user generated or occur automatically.

At block 704, the computing device selects an item from the shared file location directory or shared cache directory. For each item selected, the consistent user name-space processing routine instantiates a variable known as ghost Boolean that is either true or false. In one exemplary embodiment of the present invention, items that receive an associated ghost Boolean value of true are represented in the graphical user interface as a diffuse icon. Conversely, items that receive a ghost Boolean value of false are represented as an unaltered icon.

Returning to FIG. 7, at decision block 706, a test is conducted to determine whether the selected item is locally available. The computing device queries local storage media for a match to the selected item. If the selected item is located on local storage media, at block 708, the path for locating the item, such as a Uniform Name Location ("UNC") path, is returned. At block 710, the ghost Boolean variable associated with the selected item is set to false.

If the selected item is not stored locally, at decision block 712, a test is conducted to determine whether the selected item is available for transmission from a remote computing device. The computing device associated with the user sends queries to remote computing devices on the network. At block 714, if additional computing devices are not able to transmit the selected item, the ghost Boolean variable is set to true. If additional computing devices are able to transmit the selected item, the routine proceeds to block 708. When an item has a true ghost Boolean and is not stored locally, the host computing device is prohibited from sharing the item with remote computing devices. Before an item may be shared, its file stream data is obtained by the host computing device. The method for obtaining an item's file stream data, in accordance with the present invention, will be described with reference to FIGS. 8-9 below. However, if a user attempts to share an item that does not have file stream data stored locally, the item will be "marked" for sharing when the item's file stream data is obtained. Items that are "marked" are denoted in a different way, such as an icon with a line highlighting the icon, for example.

At decision block 716, a test is conducted to determine whether all of the items in the shared file location directory or the client side cache directory have ghost Boolean variables that have been instantiated. If all items have an associated ghost Boolean variable, at block 718, the routine terminates. If any items do not have an associated ghost Boolean variable, the routine proceeds to block 704, and blocks 704 through 716 are repeated until all of the items in the shared file location directory or the client side cache directory have a set ghost Boolean variable.

Figure 8:
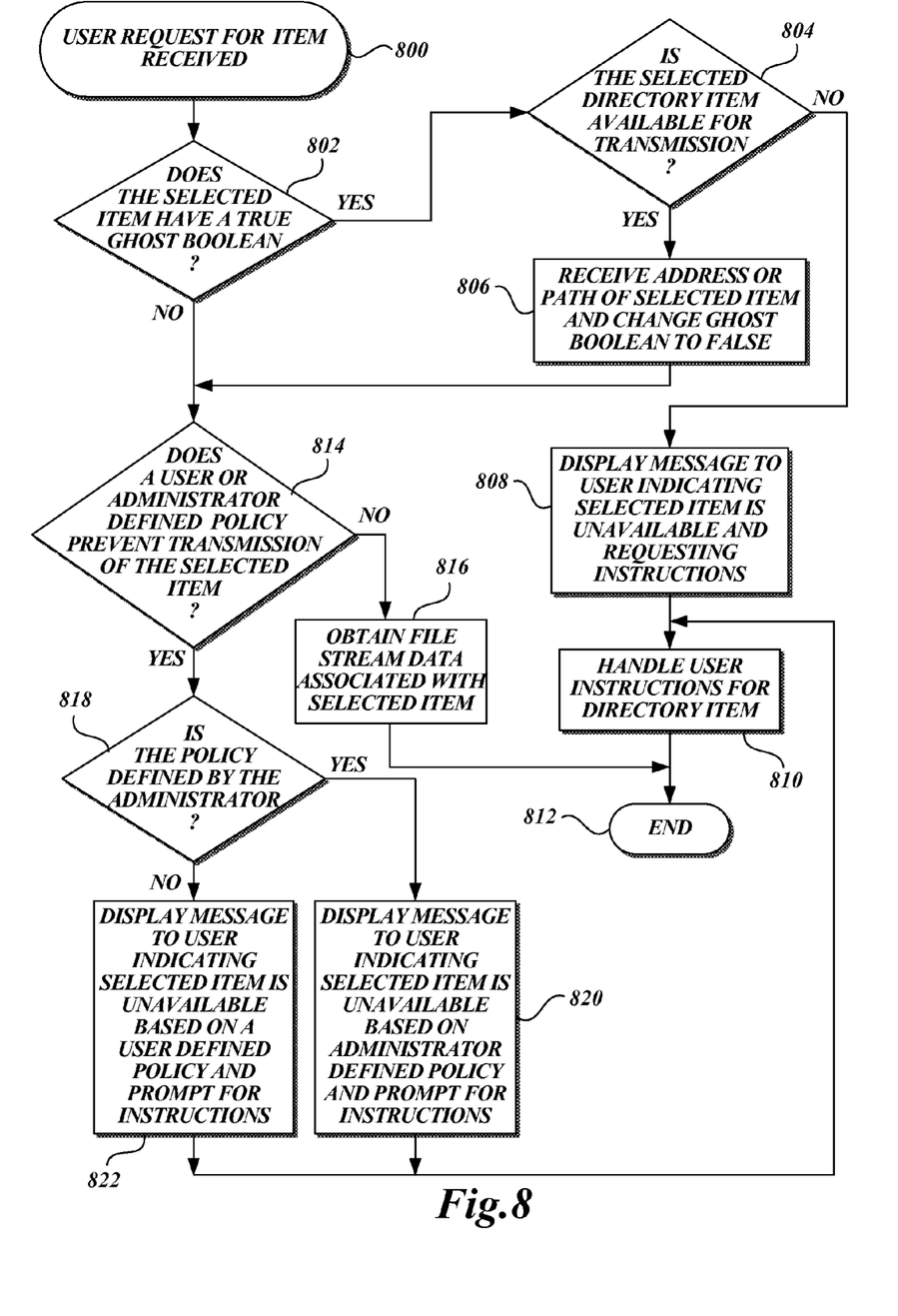
FIG. 8 is a flow diagram illustrative of a process for returning an item in response to a user request in accordance with the present invention.

FIG. 8 is a flow diagram illustrative of a process for returning an item in response to a user request. While the FIG. 8 process is ideally suited for use with the shared file location system shown in FIGS. 2-3, it may also find use in connection with the client side cache system shown in FIGS. 4-5, with suitable modification. At block 800, a user request for an item is received. In accordance with the shared file location embodiment of the invention, the item may be located on either a local or host computing device or on a remote computing device. By requesting a shared item, a user is requesting the most updated version of an item's file stream data from the computing device that contributed the item.

At decision block 802, a test is conducted to determine whether the requested item has a true value, i.e., the value associated with a ghost Boolean variable. As described above in connection with FIG. 7, when obtaining an aggregated view of a shared file location, each item obtains a value for its ghost Boolean variable. The value given to the ghost Boolean variable designates whether an item's file stream data is available for transmission to the local computing device. A ghost Boolean variable value of true indicates that file stream data is not available for transmission, while a false ghost Boolean variable value indicates that the file stream data is available.

If the requested item has a true ghost Boolean variable value, at decision block 804, a test is conducted to determine whether the item is now available for transmission from the remote computing device. If the item is available for transmission, at block 806 the address and path of the selected item is obtained by the local computing device and the ghost Boolean variable value is changed to false. If the item is not available for transmission, at block 808 a message is displayed to the user indicating that the requested item is unavailable and requesting instructions. By way of an illustrative example, the message may ask if an attempt to complete the requested transmission should be undertaken when a network connection is re-established. A person skilled in the art will recognize that alternative messages may be used to satisfy user demands. At block 810, user instructions received at block 808 are handled, and at block 812 the routine terminates.

If an item has a false ghost Boolean value, at decision block 814, a test is conducted to determine whether a network administrator or user-defined policy exists to prevent transmission of the requested item, i.e., the stream data associated with the selected item. For example, the request may be for an item containing a plurality of files. In this instance, a network administrator or user-defined policy may exist that prevents the transmission of multiple files. Or the request may be for an item larger than a specific size, such as 500 kilobytes, and a policy may exist that prevents the transmission of items larger than this size. Those skilled in the art will recognize these as merely simple examples and that many different policies may be implemented to preserve and provide security for network resources.

If an administrator- or user-defined policy does not prevent transmission of the requested item, at block 816 the item's file stream data is returned, i.e., transmitted from the remote computing device to the local computing device, then the routine terminates. Transmission at block 816 is dependent on the continued availability of the selected item's file stream data. For example, if the selected item is deleted from the remote computing device after the test to determine if the item is available (i.e., block 804), a prompt will inform the user that the selected item is not available. However, once the item's file stream data is transmitted, a user associated with the host computing device may share the item with other remote computing devices.

If a network administrator- or user-defined policy does prevent transmission of the selected item, at decision block 818 a test is conducted to determine whether the policy was defined by a network administrator. If the policy was defined by a network administrator, at block 820 a message is displayed to the user indicating that the requested item is unavailable for transmission based on an administrator policy. Also at block 820 the message asks the user for instructions regarding the administrator policy. The routine then proceeds to block 810 for the handling of any instructions received from the user. Then the routine terminates at block 812.

If the policy was defined by a user, at block 822, a message is displayed indicating that the requested item is unavailable for transmission based on a user policy. Also at block 822 the message asks the user for instructions regarding the policy. Those skilled in the art will recognize that many different instructions may be given to the user depending on the existing policy and whether it is an administrator- or user-defined policy. The routine then proceeds to block 810 for the handling of any instructions received at block 822. Then the routine terminates at block 812.

Figure 9:
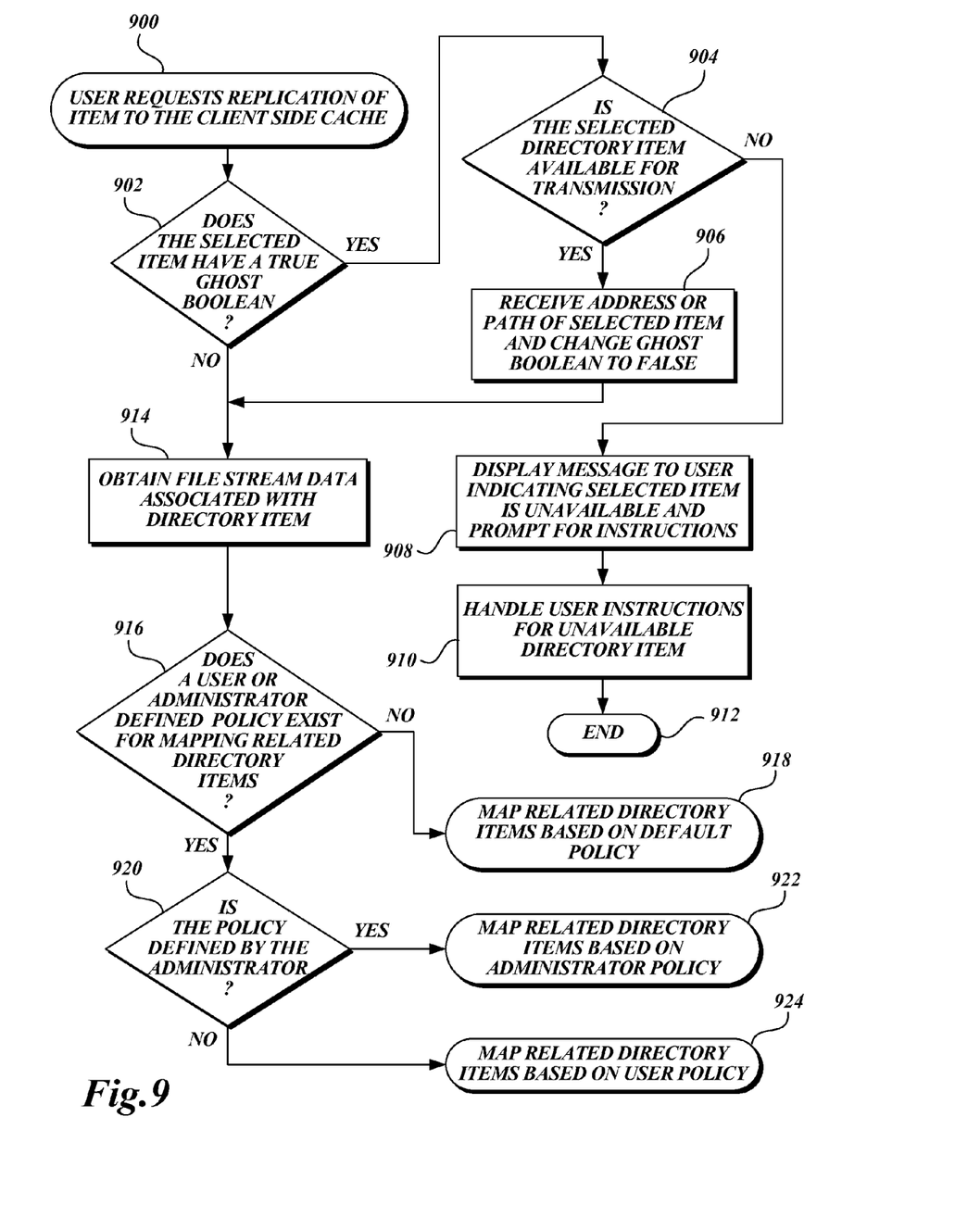
FIG. 9 is a flow diagram illustrative of a process for replicating and mapping items between remote computing devices in accordance with the present invention.

FIG. 9 is a flow diagram illustrative of the process of replicating and mapping items between computing devices such as the server computing device 402 and the client computing device 404 shown in FIGS. 4-5. At block 900, a user requests replication of an item from the directory of the server computing device to the client side cache of the client computing device.

At decision block 902, a test is conducted to determine whether the item selected for replication has a ghost Boolean variable value that is true. As described above with reference to FIG. 7, each item in a client side cache is assigned a ghost Boolean variable value. The value of the variable is an indicator of whether the file stream data of an item is available for transmission.

If an item has a true ghost Boolean value, at decision block 904 a test is conducted to determine whether the item is now available for transmission from the remote computing device. If the item is available for transmission, at block 906 the address and path of the selected item is obtained by the local computing device and the ghost Boolean value is changed to false. If the item is not available, at block 908 a message is displayed to the user indicating that the requested transmission could not be completed. Also at block 908 the message also asks the user for instructions regarding the requested transmission. As noted above in relation to FIG. 8, a person skilled in the art will recognize that different instructions may be requested. At block 910, any user instructions received at block 908 are handled. Then at block 912 the routine terminates.

If an item has a false ghost Boolean value, at block 914 the item's file stream data is transmitted from the server computing device to the client side cache. Transmission at block 914 is dependent on the continued availability of the selected item's file stream data. For example, if the selected item is deleted from the remote computing device after the test to determine if the item is available (i.e., block 904), a prompt will inform the user that the selected item is not available. However, once the item's file stream data is transmitted, a user associated with the host computing device may share the item with other remote computing devices.

At decision block 916, a test is conducted to determine whether a user- or a network administrator-defined policy exists for mapping items related to the item replicated at block 914. For example, a policy may exist that allows certain item data to be mapped without the entire item being replicated. All mapped items are visible in the client side cache and maintain the same structure. This may be indivisible in some instances. Those of ordinary skill in the art will recognize that this is a simple example and that different policies may be implemented in actual embodiments of the invention, if desired. For example, in connection with FIG. 4, a policy was described where only items at or above a particular node is a directory tree can be mapped to a client side cache. Mapped items that have not been fully replicated are unavailable for use or modification until an appropriate network connection is established. However, metadata associated with such items and options for modifying the metadata is available.

If a user- or administrator-defined policy does not exist for mapping items to be replicated, at block 918 a default policy (if implemented) is used. Then, the routine terminates. If a user- or network administrator-defined policy exists for mapping the items requested to be replicated, at decision block 918 a test is conducted to determine whether the policy is defined by a network administrator. If the policy is defined by a network, administrator, at block 922 the network administrator policy is used to map the items. Then the routine terminates. If the policy is not defined by the administrator, at block 922 the user-defined policy is used. Then, the routine terminates.

While presently preferred embodiments of the invention have been illustrated and described, it is to be understood that within the scope of the appended claims the invention can be practiced in other ways than those specifically described herein.

The invention claimed is:

1. In a computer network having two or more computing devices in communication, including a host computing device and a remote computing device, a method for generating a consistent user name-space, the method comprising:
   identifying an item to be mapped from the remote computing device to the host computing device;
   transmitting from the remote computing device to the host computing device a structure of the item identified for mapping;
   transmitting from the remote computing device to the host computing device metadata of the item identified for mapping, wherein the item is represented in a graphical user interface of the host computing device with an icon and a line highlighting the icon when a user attempts to share the item before the item is fully mapped;
   making the metadata of the item available on the host computing device;
   determining if the item is available for transmission from the remote computing device to the host computing device;
   if the item is not available for transmission, denoting an unavailable status of the item in a user name-space of the host computing device;
   permitting modification of the metadata on the host computing device;
   transmitting any modified metadata from the host computing device to the remote computing device; and
   updating the file system of the remote computing device with the modified metadata;
   alternatively, if the item is available for transmission, denoting the available status of the item in the user name-space of the host computing device.

2. The method as recited in claim 1 wherein the item is mapped to a client side cache of the host computing device.

3. The method as recited in claim 1 wherein the item is mapped to a shared file of the host computing device.

4. The method as recited in claim 1 wherein denoting the unavailable status of the item includes:
   associating a variable with the item; and
   generating a value for the variable that indicates the item is unavailable for transmission from the remote computing device to the host computing device.

5. The method as recited in claim 1, further comprising:
   representing the item in the graphical user interface of the host computing device with a diffuse icon if the variable indicates that the item is unavailable.

6. Computer storage media storing computer-executable instructions thereon that, when executed, perform a method for generating a consistent user name-space that is presentable on a host computing device and a remote computing device, the method comprising:
- identifying an item to be mapped from the remote computing device to the host computing device;
- transmitting from the remote computing device to the host computing device a structure of the item identified for mapping;
- transmitting from the remote computing device to the host computing device metadata of the item identified for mapping, wherein the item is represented in a graphical user interface of the host computing device with an icon and a line highlighting the icon when a user attempts to share the item before the item is fully mapped;
- making the metadata of the item available on the host computing device;
- determining if the item is available for transmission from the remote computing device to the host computing device;
- if the item is not available for transmission, denoting an unavailable status of the item in a user name-space of the host computing device;
- permitting modification of the metadata on the host computing device;
- transmitting any modified metadata from the host computing device to the remote computing device; and
- updating the file system of the remote computing device with the modified metadata;
- alternatively, if the item is available for transmission, denoting the available status of the item in the user name-space of the host computing device.

7. The media as recited in claim 6 wherein the item is mapped to a client side cache of the host computing device.

8. The media as recited in claim 6 wherein the item is mapped to a shared file of the host computing device.

9. The media as recited in claim 6 wherein denoting the unavailable status of the item includes:
- associating a variable with the item; and
- generating a value for the variable that indicates the item is unavailable for transmission from the remote computing device to the host computing device.

10. The media as recited in claim 6, further comprising:
representing the item in the graphical user interface of the host computing device with a diffuse icon if the variable indicates that the item is unavailable.

11. In a computer network having two or more computing devices in communication, including a host computing device and a remote computing device, a method for mapping a plurality of items from the remote computing device to the host computing device, the method comprising:
- receiving at the remote computing device a message that identifies items for mapping from the remote computing device to the host computing device;
- transmitting from the remote computing device to the host computing device the structure of the items identified for mapping;
- transmitting from the remote computing device to the host computing device the metadata of each item identified for mapping;
- permitting modification of the metadata on the host computing device;
- transmitting any modified metadata from the host computing device to the remote computing device; and
- updating the file system of the remote computing device with the modified metadata;
- storing the transmitted metadata on the host computing device, wherein an item is represented in a graphical user interface of the host computing device with an icon and a line highlighting the icon if a user attempts to share said item before file stream data of the item is located on the host computing device.

12. The method as recited in claim 11, further comprising prohibiting a user of the host computing device from sharing said item until the item's file stream data is located on the host computing device.

* * * * *